US012798389B2

(12) United States Patent
Otten

(10) Patent No.: US 12,798,389 B2
(45) Date of Patent: Nov. 17, 2026

(54) ELECTRIC POWER SUPPLY SYSTEM, VEHICLE, ELECTRIC POWER CONVERSION SYSTEM AND METHOD

(71) Applicant: LIGHTYEAR IPCO B.V., Helmond (NL)

(72) Inventor: Marald Otten, Eindhoven (NL)

(73) Assignee: LIGHTYEAR IPCO B.V., Helmond (NL)

( * ) Notice: Subject to any disclaimer, the term of this patent is extended or adjusted under 35 U.S.C. 154(b) by 729 days.

(21) Appl. No.: 18/273,935

(22) PCT Filed: Jan. 5, 2022

(86) PCT No.: PCT/EP2022/050149
§ 371 (c)(1),
(2) Date: Jul. 24, 2023

(87) PCT Pub. No.: WO2022/161747
PCT Pub. Date: Aug. 4, 2022

(65) Prior Publication Data

US 2024/0083255 A1 Mar. 14, 2024

(30) Foreign Application Priority Data

Jan. 26, 2021 (NL) ...................................... 2027384

(51) Int. Cl.
*H02J 7/00* (2026.01)
*B60L 8/00* (2006.01)
(Continued)

(52) U.S. Cl.
CPC ............... *B60L 8/003* (2013.01); *B60L 58/20* (2019.02); *B60L 2210/12* (2013.01); *B60L 2210/14* (2013.01)

(58) Field of Classification Search
CPC ...... B60L 8/003; B60L 58/20; B60L 2210/12; B60L 2210/14
(Continued)

(56) References Cited

U.S. PATENT DOCUMENTS 11,198,366 B2 * 12/2021 Hirano ...................... B60L 1/00
2008/0100258 A1 * 5/2008 Ward ................. H01M 10/465
320/101
(Continued)

FOREIGN PATENT DOCUMENTS

DE 102016001123 A1 8/2017
EP 2752329 A1 7/2014
(Continued)

OTHER PUBLICATIONS

Netherlands Search Report and Written Opinion dated Oct. 13, 2021, for Netherlands Patent Application No. 2027384.
(Continued)

*Primary Examiner* — Alexis B Pacheco
(74) *Attorney, Agent, or Firm* — Patterson + Sheridan, LLP

(57) ABSTRACT

There is provided an electric power supply system comprising a solar panel, a first battery, a second battery, a first converter, a second converter and a switching device. The solar panel generates electric power at a first voltage. The first battery stores electric power at a second voltage. The second battery stores electric power at a third voltage. In a first operation mode, the switching device transfers electric power from the solar panel to the first battery. The first converter converts the electric power from the first voltage to the second voltage. In a second operation mode, the switching device transfers electric power from the first battery to the second battery. The first converter converts the electric power from the second voltage to the first voltage.
(Continued)

The second converter converts the first voltage to the third voltage.

20 Claims, 3 Drawing Sheets

(51) Int. Cl.
*B60L 58/20* (2019.01)
*H02J 7/14* (2006.01)

(58) Field of Classification Search
USPC .......................................................... 320/132
See application file for complete search history.

(56) References Cited

U.S. PATENT DOCUMENTS

2011/0241604 A1* 10/2011 Anderson ............... B60L 53/52 136/246
2011/0301790 A1* 12/2011 Atluri ..................... B60L 58/20 180/65.265
2016/0134157 A1* 5/2016 Maeno ...................... H02J 7/35 320/101
2017/0267113 A1* 9/2017 Harada ................. B60L 3/0084
2018/0233920 A1* 8/2018 Kodama ................. H02S 10/40
2018/0251034 A1* 9/2018 Lee ........................... B60L 1/02
2018/0283887 A1* 10/2018 Dudar ................ G01C 21/3469
2020/0231036 A1* 7/2020 Go .......................... B60L 58/20
2020/0247258 A1 8/2020 Park et al.
2021/0078428 A1* 3/2021 Jung ....................... B60L 50/66
2021/0221233 A1* 7/2021 Jung ....................... B60L 53/22

FOREIGN PATENT DOCUMENTS

JP 2019129690 A 8/2019
WO 2012041178 A1 4/2012
WO 2013030941 A1 3/2013
WO 2014076884 A1 5/2014

OTHER PUBLICATIONS

PCT International Search Report and Written Opinion dated Apr. 21, 2022, for International Application No. PCT/EP2022/050149.
Japanese Office Action dated Nov. 18, 2025, for Japanese Patent Application No. 2023-545233.

* cited by examiner

ELECTRIC POWER SUPPLY SYSTEM, VEHICLE, ELECTRIC POWER CONVERSION SYSTEM AND METHOD

CROSS-REFERENCE TO RELATED APPLICATIONS

This application is a national stage application under 35 U.S.C. 371 of International Application No. PCT/US2022/050149, filed Jul. 24, 2023, which claims priority to Netherlands Patent Application No. 2027384, filed Jan. 26, 2021, each of which is incorporated herein in its entirety.

BACKGROUND

Field

The invention relates to an electric power supply system. The invention further relates to a vehicle comprising the electric power supply system. Further, the invention relates to an electric power conversion system and a method for providing electric power.

The project leading to this application has received funding from the European Union's Horizon 2020 research and innovation program under grant agreement No. 848620.

Description of the Related Art

To provide environmentally friendly ways of transportation, electric vehicles are provided with solar panels. The solar panel provides electric power to the vehicle, making the vehicle less dependent on electric power from the power grid or, in case of a hybrid vehicle, on electric power generated by a combustion engine. Electric power generated by a solar panel is an environmentally friendly source of energy, because it does not result in the generation of pollutants, such as the greenhouse gas carbon dioxide.

The electric power is used by different systems on the vehicle. Some systems, such as the drive system to drive the vehicle, require electric power at a high voltage. Other systems, such as the on-board computer and the lighting system, require electric power at a low voltage.

The solar panel is designed to provide electric power at a certain voltage. However, the voltage as provided by the solar panel is typically not the same as the voltage needed for the systems on the vehicle. The voltage generated by the solar panel is different from the high voltage for the drive system and different from the low voltage for the on-board computer.

As a result of the requirements for electric power with different voltages, the electric power supply system of the vehicle needs to be able to convert electric power from one voltage to another voltage. A known electric power supply system is shown in United States patent application number US2015/0280487. The known electric power supply system has a solar panel, a low voltage battery and a high voltage battery. The solar panel provides electric power to a low voltage battery. When the voltage of the high voltage battery becomes too low, electric power from the low voltage battery is boosted via a buck-boost converter to the high voltage of the high voltage battery to charge the high voltage battery.

A problem of the known electric power supply system is that converting the electric power from the voltage of the solar panel to the voltage of the low voltage battery, and then from the voltage of the low voltage battery to the voltage of the high voltage battery causes a significant energy loss.

SUMMARY

It is an objective of the invention to provide an improved electric power supply system or at least to provide an alternative.

The objective of the invention is achieved by an electric power supply system that comprises a solar panel, a first battery, a second battery, a first converter, a second converter and a switching device. The solar panel is for generating electric power at a first voltage. The first battery is for storing electric power at a second voltage. The second battery is for storing electric power at a third voltage. The first converter has a first terminal and a second terminal. The switching device is adapted to transfer electric power in a first operation mode and in a second operation mode. In the first operation mode, the switching device is adapted to transfer electric power from the solar panel to the first terminal of the first converter, and from the second terminal of the first converter to the first battery. The first converter is adapted to convert the electric power from the solar panel from the first voltage at the first terminal to the second voltage at the second terminal. In the second operation mode, the switching device is adapted to transfer electric power from the first battery to the second terminal of the first converter, and from the first terminal of the first converter to the second converter, and from the second converter to the second battery. The first converter is adapted to convert the electric power from the first battery from the second voltage at the second terminal to the first voltage at the first terminal. The second converter is adapted to convert the electric power from the first battery from the first voltage to the third voltage.

The inventors have discovered that by using, in the first operation mode, the first terminal as an input and the second terminal as an output of the first converter, and by using, in the second operation mode, the second terminal as an input and the first terminal as an output of the first converter, the first converter is able to convert the first voltage to the second voltage and vice versa. By using the first converter to convert the first voltage on the first terminal to the second voltage on the second terminal in the first operation mode and to convert the second voltage on the second terminal to the first voltage on the first terminal in the second operation mode, a simple type of converter can be used as the first converter. For example, the first converter is a boost-converter that is adapted to increase a voltage from the second terminal to the first terminal. In another example, the first converter is a buck-converter that is adapted to reduce a voltage from the first terminal to the second terminal.

Increasing a voltage is further also referred to as boosting a voltage. Reducing a voltage is further also referred to as bucking a voltage.

By providing the first converter and the second converter, the voltage is converted in two steps from the second voltage via the first voltage to the third voltage. Converting from the second voltage to the third voltage in two steps is more efficient than converting from the second voltage to the third voltage in a single step. The result is that the electric power supply system is able to efficiently store electric power generated by a solar panel on a first battery, and to efficiently charge the second battery with electric power from the first battery.

The solar panel, such as a solar cell or photovoltaic cell or photoelectric cell, is any suitable device that is able to convert light into electricity by using a photovoltaic effect. The solar panel is, for example, an amorphous silicon solar panel or a gallium arsenide germanium solar panel or a monocrystalline solar panel or an organic solar panel or a thin-film solar panel. The solar panel comprises, for example, a plurality of subpanels that are electrically connected to each other. The solar panel has, for example, a plane surface, a curved surface and/or a double curved surface to receive light to generate the electric power. For example, the solar panel covers at least a part of all of a rooftop of a vehicle.

The first battery is any type of suitable battery for storing electric power at the second voltage. For example, the first battery comprises a nickel-iron battery or a lithium-ion battery or a lithium-ion polymer battery or a nickel-metal hydride battery. The first battery is a rechargeable battery that is able to receive electric power in the first operation mode, and to provide electric power in the second operation mode. The first battery comprises, for example, a plurality of batteries electrically connected together to obtain a desired voltage of the first battery or a desired electric capacity of the first battery.

The second battery is any type of suitable battery for storing electric power at the third voltage. For example, the second battery comprises a nickel-iron battery or a lithium-ion battery or a lithium-ion polymer battery or a nickel-metal hydride battery. The second battery is, for example, a rechargeable battery that is able to receive electric power in the second operation mode, and to provide electric power in another operation mode. The second battery comprises, for example, a plurality of batteries electrically connected together to obtain a desired voltage of the second battery or a desired electric capacity of the second battery. The second battery is, for example, the same type of battery as the first battery, but adapted to operate at the third voltage instead of the second voltage. The second battery has a larger electric capacity, a smaller electric capacity or an equally large electric capacity as the first battery.

In an embodiment, the first converter is adapted to buck the first voltage at the first terminal to the second voltage at the second terminal in the first operation mode, and to boost the second voltage at the second terminal to the first voltage at the first terminal in the second operation mode.

According to this embodiment, the first converter is adapted to transfer electric power from the first terminal to the second terminal in the first operation mode. The first converter decreases the voltage of the electric power from the first voltage at the first terminal to the second voltage at the second terminal. The first converter is for example a buck-converter. In the second operation mode, the first converter transfers electric power from the second terminal to the first terminal. By transferring electric power in the second operation mode in an opposite direction compared to the first operation mode, the first converter is able to increase the voltage of the electric power from the second voltage at the second terminal to the first voltage at the first terminal.

In an embodiment, the switching device is adapted to transfer electric power in a third operation mode from the second battery via the second converter to the first terminal of the first converter, and from the second terminal of the first converter to the first battery. The second converter is adapted to convert the electric power from the second battery from the third voltage to the first voltage. The first converter is adapted to further convert the electric power from the second battery from the first voltage at the first terminal to the second voltage at the second terminal.

According to this embodiment, the first battery is charged by the second battery in the third operation mode. The situation may occur that there is a large difference between a state-of-charge of the first battery and the state-of-charge of the second battery. The difference is for example larger than a threshold. For example, the first battery is almost depleted whereas the second battery is almost fully charged. To ensure that the first battery is able to provide sufficient electric power, electric power is transferred from the second battery via the second converter and via the first converter to the first battery. Because the second converter converts the electric power from the second battery from the third voltage to the first voltage, the first converter is able to further convert the electric power from the first voltage to the second voltage. As a result, the first converter is not only used in the first operation mode and the second operation mode, but also in the third operation mode. By making extensive use of the first converter, the electric power supply system requires only a minimum number of electronic components.

In an embodiment, in the third operation mode, the switching device is adapted to transfer electric power from both the second converter and the solar panel to the first terminal of the first converter.

According to this embodiment, the solar panel provides electric power in the third operation mode. In some situations, for example during cloudy weather and/or when there is a high demand for electric power from the first battery, it may be desirable to charge the first battery with electric power from both the solar panel and the second battery simultaneously. The second converter converts electric power from the second battery from the third voltage to the first voltage and provides the electric power at the first voltage at the first terminal of the first converter. The solar panel provides electric power at the first voltage at the first terminal of the first converter. Because both the solar panel and the second battery provide electric power at the first voltage at the first terminal of the first converter, the first converter is able to efficiently convert the electric power from the first voltage at the first terminal to the second voltage at the second terminal. The electric power at the second voltage at the second terminal is then further transferred to the first battery to charge the first battery.

In an embodiment, the second converter has a third terminal and a fourth terminal. In the second operation mode, the third terminal is arranged to receive electric power from the first converter, and the fourth terminal is arranged to transfer electric power to the second battery. The second converter is adapted to boost the first voltage at the third terminal to the third voltage at the fourth terminal. In the third operation mode, the fourth terminal is arranged to receive electric power from the second battery, and the third terminal is arranged to transfer the electric power to the first converter, wherein the second converter is adapted to buck the third voltage at the fourth terminal to the first voltage at the third terminal.

According to this embodiment, the second converter is adapted to transfer electric power from the third terminal to the fourth terminal in the second operation mode. The second converter increases the voltage of the electric power from the first voltage at the third terminal to the third voltage at the fourth terminal. The second converter is for example a boost-converter. In the third operation mode, the second converter transfers electric power from the fourth terminal to the third terminal. By transferring electric power in the third operation mode in an opposite direction than in the second operation mode, the second converter is able to decrease the voltage of the electric power from the third voltage at the fourth terminal to the first voltage at the third terminal.

In an embodiment, in the second operation mode, the switching device is adapted to transfer electric power from both the first terminal of the first converter and the solar panel to the second converter.

According to this embodiment, the second converter receives electric power from both the solar panel and the first battery simultaneously. This may be beneficial in the situation in which the first battery is sufficiently charged, whereas the second battery is not sufficiently charged. By providing electric energy from both the solar panel and the first battery to the second battery via the second converter, the second battery can be charged rapidly. The second converter is able to efficiently convert the electric power from the solar panel and the electric power from the first battery to the third voltage, because both the electric power from the solar panel and the electric power from the first battery are provided to the third terminal of the second converter at the first voltage. In addition, losses of energy are reduced, because the electric energy from the solar panel is directly provided to the second converter, instead of being provided first to the first battery and then being provided to the second converter.

In an embodiment, the second voltage is a high voltage that is higher than the first voltage. The third voltage is a low voltage that is lower than the first voltage.

In an embodiment, the second voltage is a low voltage that is lower than the first voltage. The third voltage is a high voltage that is higher than the first voltage.

According to this embodiment, the first battery is a low voltage battery that operates at a low voltage. The low voltage is lower than the voltage at which the solar panel provides electric power. The second battery is a high voltage battery that operates at a high voltage. The high voltage is higher than the voltage at which the solar panel provides electric power. The first battery provides, for example, electric power to an electric system that operates at the low voltage. The second battery provides, for example, electric power to an electric system that operates at the high voltage. By providing the electric power from the solar panel at the first voltage that is in between the second voltage and the third voltage, the electric power from the solar panel can be converted to either the second voltage or the third voltage without much energy loss. The amount of energy loss is typically related to the difference between the voltage prior to conversion and the voltage after conversion. For example, converting an input voltage to an output voltage that is ten times larger than the input voltage results in more energy loss than converting an input voltage to an output voltage that is two times larger than the input voltage. By providing the electric power from the solar panel at the first voltage that is in between the second voltage and the third voltage, the difference between the first voltage and the second voltage, and between the first voltage and the third voltage is minimized. As a result, energy losses are limited when converting the electric power from the solar panel to either the second voltage or the third voltage.

In an embodiment, the first voltage is 4-8 times larger than the low voltage, wherein the high voltage is 4-8 times larger than the first voltage.

According to this embodiment, the first voltage of the solar panel is 4-8 times larger than the second voltage of the first battery. The third voltage of the second battery is 4-8 times larger than the first voltage of the solar panel. The third voltage is thus 16-64 times larger than the second voltage. By providing the first voltage, the second voltage and the third voltage with these differences between them, converting them can be done without excessive energy loss, while obtaining a large difference between the second voltage and the third voltage. Inexpensive and efficient converters are available that either buck or boost a voltage with a factor 4-8. Such a converter is for example able to reduce an input voltage to an output voltage that is 4-8 times smaller than the input voltage. Such a converter is for example able to increase an input voltage to an output voltage that is 4-8 times larger than the input voltage.

For example, the first converter and/or the second converter is a boost converter that comprises an inductor. By selecting an inductor with a suitable inductance, and by setting the duty cycle of the boost converter, the boost converter is adapted to output a voltage that is different from the input voltage by a factor 4-8. In another example, the first converter and/or the second converter is a buck converter that comprises an inductor. By selecting an inductor with a suitable inductance, and by setting the duty cycle of the buck converter, the buck converter is adapted to output a voltage that is different from the input voltage by a factor 4-8.

In an embodiment, the low voltage is in the range of 11-15 V, for example 12 V. The high voltage is in the range 300-430V, for example 360V. The first voltage is in the range of 50-60V, for example 55V.

According to this embodiment, the low voltage is suitable to be used for a range of applications that require a voltage of about 12 V. The high voltage around 360 V is suitable for a range of application that require a high electric power. By providing the high voltage, the amount of electric current is reduced while providing such a high electric power. Reducing the electric current, reduces energy loss in the transfer of electric power. By providing the first voltage of the solar panel around 55 V, the requirements for the electrical insulation of the solar panel are low. The requirements are low, because the voltage of about 55 V does not pose a great risk of electrocution. The low requirements result, for example, in the use of only a thin layer of insulation material on the electric components and wires of the solar panel. For example, electric wires and components are placed closely together without the risk of an electrical discharge between those electric wires and components. This allows more design freedom to arrange the solar panel and the electric connections with the solar panel.

In case the solar panel is arranged on a vehicle, there is no need for additional safety measures to prevent electrocution in case of an accident with the vehicle. Because the solar panel is arranged at an exterior of the vehicle, there is a risk that during an accident people in the vehicle or rescuers come into contact with an electrical part of the solar panel. For example, during an accident, the solar panel may be torn exposing an electrically conducting part of the solar panel. The electrically conducting part may continue to carry an electric current after the accident. A person exiting the vehicle may accidentally touch the electrically conducting part. In another example, a rescuer needs to cut open the vehicle to get people out of the vehicle. By doing so, the rescuer may need to cut through a part of the vehicle that holds an electrically conducting part, such as a wire that transfers an electric current from the solar panel. Contact with the electrically conducting part of the solar panel may be either directly or via a tool, such as a cutting tool. Because the voltage of the solar panel is limited to about 55 V, there is no risk of electrocution. When a person comes into contact with the first voltage of about 55 V, the contact would not result in injury.

Further, by arranging the second voltage in the range of 11-15 V, the third voltage in the range 300-430V, and the first voltage in the range of 50-60V, there is about a factor five between the first voltage and the second voltage, and about a factor six between the first voltage and the third voltage. The second voltage of about 12 V is about a factor five times smaller than the first voltage of about 55 V. The third voltage of about 350 V is about a factor six times larger than the first voltage of about 55 V. Operating the first converter to convert the first voltage with a factor of five to the second voltage, and operating the second converter to convert the first voltage with a factor of six to the third voltage, is an efficient way to operate the first converter and the second converter. The first converter and the second converters are able to perform these conversions with only a limited amount of energy loss.

In an embodiment, at least one of the first converter and the second converter is adapted to perform maximum power point tracking (MPPT).

According to the embodiment, the first converter and/or the second converter is adapted to optimize the electric power provided by the solar panel by performing maximum power point tracking, which is further referred to as MPPT. Only one of the first converter and the second converter is adapted to perform MPPT, or both the first converter and the second converter are adapted to perform MPPT. The amount of electric power that the solar panel produces depends on various conditions. For example, such conditions are whether it is sunny or cloudy, whether it rains, and what the temperature is. Another condition is, for example, whether a part or all of the solar panel is covered by shade or not. Depending on these conditions, the solar panel provides a certain voltage at a certain electric current. The electric power that is provided by the solar panel is the product of the voltage and the electric current. It is desired that the electric power is at large as possible. To obtain a large electric power from the solar panel, at least one of the first converter and the second converter is adapted to set the first voltage and/or to control the electric current through the solar panel to maximize the electric power extracted from the solar panel. Preferably, the first converter and/or the second converter is adapted not to perform MPPT when the solar panel does not provide electric power, for example during nighttime. In case no electric power is provided by the solar panel, performing MPPT would limit the efficiency with which the first converter or the second converts the voltage of an electric current between the first battery and the second battery. During nighttime, in case the solar panel does not provide electric power, it is beneficial to use the first converter and the second converter to equalize the state-of-charge of the first battery and the second battery, without performing MPPT.

In an embodiment, the electric power supply system comprises a control system adapted to control the switching device in the first operation mode and in the second operation mode.

According to this embodiment, the control system is adapted to put the switching device in a position to connect the solar panel to the first battery via the first converter in the first operation mode. The control system is adapted to put the switching device in a position to connect the first battery to the second battery via the first converter and the second converter in the second operation mode. The control system has, for example, an input terminal to receive input. Based on the input, the control system controls the switching device to switch from the first operation mode to the second operation mode and vice versa. For example, the input comprises information about the state-of-charge of the first battery and/or the second battery. The input comprises, for example, information about the amount of electric power generated by the solar panel. The input comprises, for example, information about a demand of electric power from the first battery and/or the second battery. The information in the input is, for example, provided by sensors. The sensor is, for example, an electric current sensor adapted to provide information about an electric current through the first battery and/or the second battery. The sensor is, for example, a voltage sensor adapted to provide information about a voltage over the first battery and/or the second battery. The sensor is, for example, a light sensor adapted to provide information about the amount of light incident on the solar panel. The sensor is, for example, a temperature sensor adapted to provide information about the temperature of the first battery, and/or the second battery, and/or the solar panel, and/or the ambient temperature.

In a second aspect of the invention, there is provided a vehicle comprising the electric power supply system mentioned above, and an electric system adapted to receive electric power from the electric power supply system.

According to the second aspect, the vehicle comprises the solar panel to provide electric power to an electric system of the vehicle. The electric system receives electric power either via the first battery, the second battery or both the first battery and the second battery. In an example, the electric system is able to receive electric power directly from the solar panel in addition to electric power from the first battery and/or the second battery.

In an embodiment, the vehicle comprises a drive system to drive the vehicle. The drive system comprises the electric system.

According to the embodiment, the drive system is provided with electric power by the electric power supply system. The drive system comprises, for example, an electric motor to propel the vehicle. For example, the electric motor is an inwheel-motor arranged in a wheel of the vehicle. For example, the vehicle comprises an inwheel-motor in every wheel. The inwheel-motor has a rotor that is rotatable relative to a stator. By providing electric power to the inwheel-motor, the inwheel-motor generates a torque to rotate the rotor relative to the stator. By rotating the rotor, the vehicle is propelled. In another example, the drive system comprises an electric motor, a gear box and a drive shaft. The electric motor is provided with electric power from the electric power supply system. The electric motor drives the drive shaft via the gear box. The drive shaft is, for example, connected to one or more wheels of the vehicle to propel the vehicle.

In an embodiment, the vehicle comprises an auxiliary system. One of the first battery and the second battery provides electric power to the auxiliary system. The other of the first battery and the second battery provides electric power to the electric system.

According to this embodiment, the vehicle has the drive system and the auxiliary system. The auxiliary system may be any system other than the drive system. The auxiliary system comprises, for example, a lighting system of the vehicle adapted to operate the lights of the vehicle. The auxiliary system comprises, for example, a climate control system of the vehicle adapted to control a temperature of the cabin of the vehicle. The cabin provides space in or on the vehicle to accommodate people. In an example, the auxiliary system supports the drive system. For example, the auxiliary system comprises a control system that controls the drive system or parts thereof. In another example, the auxiliary system comprises a temperature control system adapted to control the temperature of the first battery and/or the second battery. The temperature control system is for example adapted to heat the first battery and/or the second battery in case temperature of the first battery and/or the second battery is lower than a threshold.

In a third aspect of the invention, there is provided an electric power conversion system comprising a first converter, a second converter and a switching device. The first converter has a first terminal and a second terminal. The second converter has a third terminal and a fourth terminal. The switching device has a first switch terminal, a second switch terminal, and a third switch terminal. The switching device is adapted to transfer electric power in a first operation mode and in a second operation mode. In the first operation mode, the switching device is adapted to transfer electric power from the first switch terminal to the first terminal of the first converter, and from the second terminal of the first converter to the second switch terminal. The first converter is adapted to convert the electric power from a first voltage at the first terminal to a second voltage at the second terminal. In the second operation mode, the switching device is adapted to transfer electric power from the second switch terminal to the second terminal of the first converter, and from the first terminal of the first converter to the third terminal of the second converter, and from the fourth terminal of the second converter to the third switch terminal. The first converter is adapted to convert the electric power from the second switch terminal from the second voltage at the second terminal to the first voltage at the first terminal. The second converter is adapted to convert the electric power from the first terminal from the first voltage at the third terminal to a third voltage at the fourth terminal.

In an embodiment the first converter is adapted to buck the first voltage at the first terminal to the second voltage at the second terminal in the first operation mode, and to boost the second voltage at the second terminal to the first voltage at the first terminal in the second operation mode.

In an embodiment, the first switch terminal is adapted to be connected to a solar panel. The second switch terminal is adapted to be connected to a first battery. The third switch terminal is adapted to be connected to a second battery.

In a fourth aspect of the invention, there is provided a method for providing electric power. The method comprises:

- step 1: providing electric power at a first voltage with a solar panel to a first battery while converting the electric power from the solar panel from the first voltage to a second voltage.
- step 2: providing electric power from the first battery to a second battery while converting the electric power from the first battery from the second voltage to the first voltage, and while further converting the electric power from the first battery from the first voltage to the third voltage.
- step 3: providing electric power from the second battery to the first battery while converting the electric power from the second battery from the third voltage to the first voltage, and while further converting the electric power from the second battery from the first voltage to the second voltage.

In an embodiment, the method comprises:

- step 4: providing, while performing step 3, electric power from the solar panel to the first battery while converting the electric power from the solar panel from the first voltage to the second voltage.

BRIEF DESCRIPTION OF THE DRAWINGS

The invention will be described in more detail below under reference to the figures, in which in a non-limiting manner exemplary embodiments of the invention will be shown. The figures show in.

DETAILED DESCRIPTION

Figure 1:
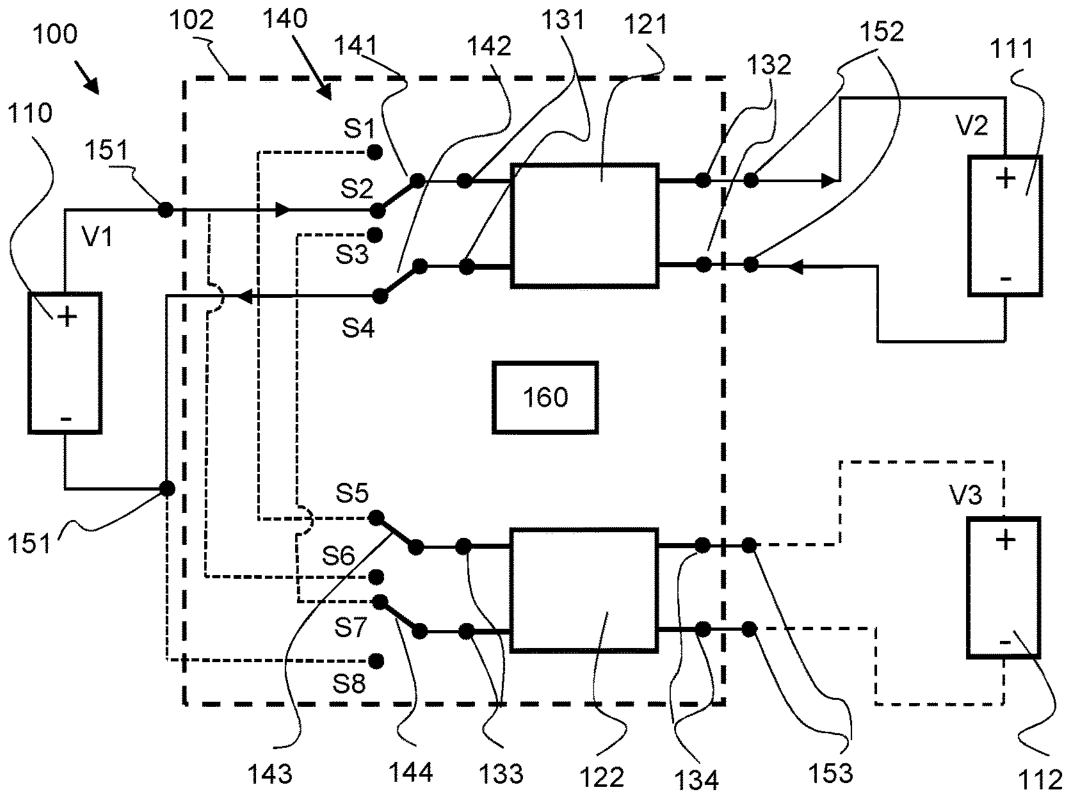
FIG. 1: an embodiment of the invention in a first operation mode in which the solar panel charges the first battery.

FIG. 1 depicts an embodiment of the invention in a first operation mode. FIG. 1 depicts the electric power supply system 100 that comprises a solar panel 110, a first battery 111, a second battery 112, a first converter 121, a second converter 122 and a switching device 140. The solar panel 110 is adapted to generate electric power at a first voltage V1. The first battery 111 is for storing electric power at a second voltage V2. The second battery 112 is for storing electric power at a third voltage V3. The first converter 121 has a first terminal 131 and a second terminal 132. The switching device 140 is adapted to transfer electric power, while in the first operation mode, from the solar panel 110 to the first terminal 131 of the first converter 121, and from the second terminal 132 of the first converter 121 to the first battery 111. The first converter 121 is adapted to convert the electric power from the solar panel 110 from the first voltage V1 at the first terminal 131 to the second voltage V2 at the second terminal 132.

The "+" signs in FIG. 1 depict the positive poles of respectively the solar panel 110, the first battery 111 and the second battery 112. The '-' signs in FIG. 1 depict the negative poles of respectively the solar panel 110, the first battery 111 and the second battery 112.

The first terminal 131 comprises a connection with a positive pole and with a negative pole. The second terminal 132 comprises a connection with a positive pole and with a negative pole.

The solar panel 110, the first battery 111, the second battery 112, the first converter 121 and the second converter 122 are connected to each other via electrical connections, such as electric wires. The electrical connections are represented in the figures as solid lines and as dashed lines. Solid lines between the solar panel 110, the first battery 111 and the second battery 112 indicate that the switching device 140 is set to allow an electric current through the electrical connections represented by the solid lines. Dashed lines between the solar panel 110, the first battery 111 and the second battery 112 indicate that the switching device 140 is set to prevent an electric current through the electrical connections represented by the dashed lines.

The first converter 121, the second converter 122 and the switching device 140 together form at least part of an electric power conversion system 102. The switching device 140 has a first switch terminal 151, a second switch terminal 152, and a third switch terminal 153. Each of the first switch terminal 151, the second switch terminal 152 and the third switch terminal 153 is depicted twice in FIG. 1, once for a positive pole connection and once for a negative pole connection. The first switch terminal 151 is connected to the solar panel 110. The second switch terminal 152 is connected to the first battery 111. The third switch terminal 153 is connected to the second battery 112.

In the first operation mode, the switching device 140 is adapted to transfer electric power from the first switch terminal 151 to the first terminal 131 of the first converter 121, and from the second terminal 132 of the first converter 121 to the second switch terminal 152. The first converter 121 is adapted to convert the electric power from a first voltage V1 at the first terminal 131 to a second voltage V2 at the second terminal 132. The first terminal 131 of the first converter 121 is connectable to the solar panel 110. The second terminal 132 of the first converter 121 is connectable to the first battery 111. The second converter 122 is connectable to the second battery 112 via the fourth terminal 134 of the second converter 122. The first switch terminal 151 is adapted to be connected to the solar panel 110. The second switch terminal 152 is adapted to be connected to a first battery 111. The third switch terminal 153 is adapted to be connected to a second battery 112.

At least one of the first converter 121 and the second converter 122 is adapted to perform maximum power point tracking (MPPT).

The electric power supply system 100 comprises a control system 160.

The switching device 140 comprises switches 141, 142, 143 and 144. Switch 141 is arranged to connect terminal S1 to the positive pole of the first terminal 131 in one switch position and to connect terminal S2 to the positive pole of the first terminal 131 in another switch position. Switch 142 is arranged to connect terminal S3 to the negative pole of the first terminal 131 in one switch position and to connect terminal S4 to the negative pole of the first terminal 131 in another switch position. Switch 143 is arranged to connect terminal S5 to the positive pole of the third terminal 133 in one switch position and to connect terminal S6 to the positive pole of the third terminal 133 in another switch position. Switch 144 is arranged to connect terminal S7 to the negative pole of the third terminal 133 in one switch position and to connect terminal S8 to the negative pole of the third terminal 133 in another switch position.

Terminal S1 is connected to terminal S5. Terminal S2 is connected to terminal S6 and to the positive pole of the first switch terminal 151. Terminal S3 is connected to terminal S7. Terminal S4 is connected to the negative pole of the first switch terminal 151 and to terminal S8.

In the first operation mode, switch 141 is connected to terminal S2 to connect the positive pole of the solar panel 110 to the first terminal 131 of the first converter 121. The switch 142 is connected to terminal S4 to connect the negative pole of the solar panel 110 to the first terminal 131 of the first converter 121. By connecting the switch 141 to terminal S1 and the switch 142 to terminal S4, an electric current is able to flow between the solar panel 110 and the first battery 111. This electric current transfers electric power from the solar panel 110 to the first battery 111 to charge the first battery 111.

Figure 2:
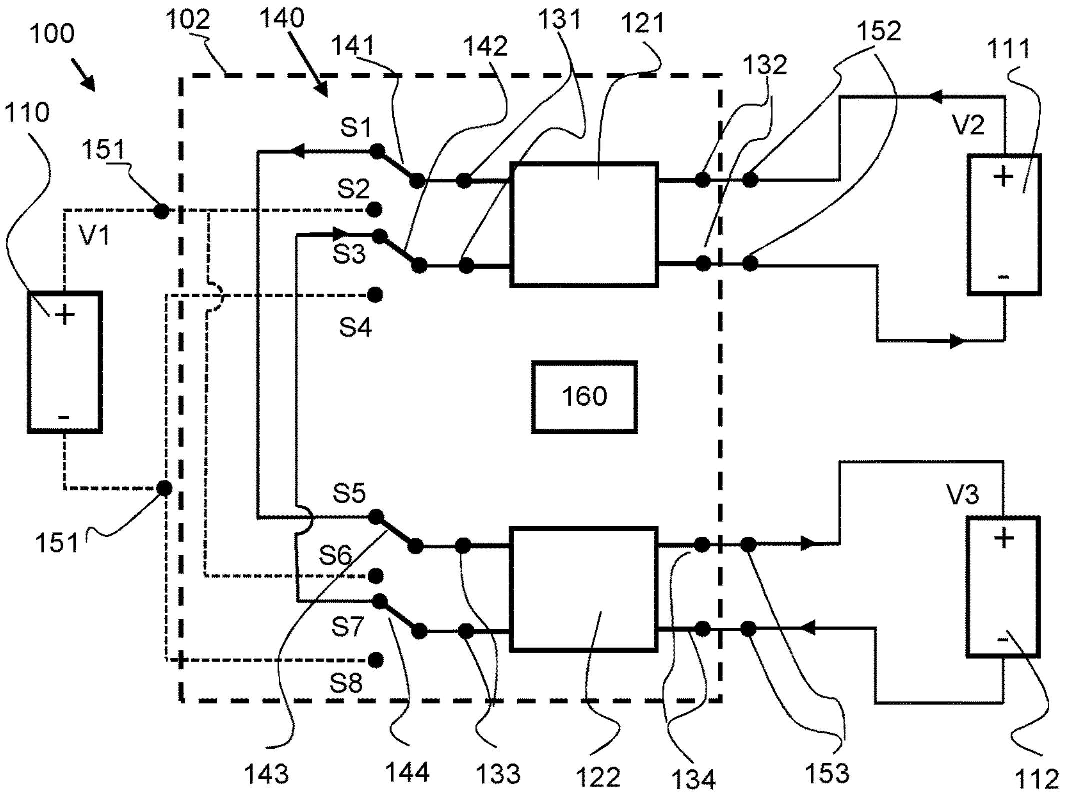
FIG. 2: the embodiment of the invention in a second operation mode in which the first battery charges the second battery.

FIG. 2 depicts the embodiment of FIG. 1 in a second operation mode in which the first battery 111 charges the second battery 112. In the second operation mode, the switching device 140 is adapted to transfer electric power from the first battery 111 to the second terminal 132 of the first converter 121, and from the first terminal 131 of the first converter 121 to the second converter 122, and from the second converter 122 to the second battery 112. The first converter 121 is adapted to convert the electric power from the first battery 111 from the second voltage V2 at the second terminal 132 to the first voltage V1 at the first terminal 131. The second converter 122 is adapted to convert the electric power from the first battery 111 from the first voltage V1 to the third voltage V3.

In the second operation mode, the switching device 140 is adapted to transfer electric power from the second switch terminal 152 to the second terminal 132 of the first converter 121, and from the first terminal 131 of the first converter 121 to the second converter 122, and from the second converter 122 to the third switch terminal 153. The first converter 121 is adapted to convert the electric power from the second switch terminal 152 from the second voltage V2 at the second terminal 132 to the first voltage V1 at the first terminal 131. The second converter 122 is adapted to convert the electric power from the third terminal 133 from the first voltage V1 to a third voltage V3 at the fourth terminal 134.

In the second operation mode, switch 141 is connected to terminal S1 to connect the positive pole of the first battery 111 to the third terminal 133 of the second converter 122. The switch 142 is connected to terminal S3 to connect the negative pole of the first battery 111 to the third terminal 133 of the second converter 122. The switch 143 is connected to the terminal S5 to connect the positive pole of the first battery 111 to the third terminal 133 of the second converter 122. The switch 144 is connected to terminal S7 to connect the negative pole of the first battery 111 to the third terminal 133 of the second converter 122. By connecting the switches 141 and 143 respectively to terminals S1 and S5, and by connecting the switches 142 and 144 respectively to terminals S3 and S7, an electric current is able to flow between the first battery 111 and the second battery 112. This electric current transfers electric power from the first battery 111 to the second battery 112 to charge the second battery 112.

The control system 160 is adapted to control the switching device 140 to connect the switches 141-144 respectively with terminals S1, S3, S5 and S7. The control system 160 may further be adapted to control the direction of the electric current from the first battery 111 to the second battery 112 to charge the second battery 112 with electric power from the first battery 111.

The first converter 121 is adapted to buck the first voltage V1 at the first terminal 131 to the second voltage V2 at the second terminal 132 in the first operation mode. The first converter 121 is adapted to boost the second voltage V2 at the second terminal 132 to the first voltage V1 at the first terminal 131 in the second operation mode. The second voltage V2 is a low voltage that is lower than the first voltage V1. The third voltage V3 is a high voltage that is higher than the first voltage V1.

In this embodiment, the first voltage V1 is 4-8 times larger than the second voltage V2. The third voltage V3 is 4-8 times larger than the first voltage V1. The second voltage V2 is in the range of 11-15 V, for example 12 V. The third voltage V3 is in the range 300-430V, for example 360V. The first voltage V1 is in the range of 50-60V, for example 55V.

In an alternative embodiment, the second voltage V2 is a high voltage that is higher than the first voltage V1. The third voltage V3 is a low voltage that is lower than the first voltage V1. In the alternative embodiment, the first voltage V1 is 4-8 times smaller than the second voltage V2. The third voltage V3 is 4-8 times smaller than the first voltage V1. The third voltage V3 is in the range of 11-15 V, for example 12 V. The second voltage V2 is in the range 300-430V, for example 360V. The first voltage V1 is in the range of 50-60V, for example 55V.

The control system 160 is adapted to control the switching device 140 in the first operation mode and in the second operation mode. The control system 160 is connected to the switching device 140 to send a control signal to the switching device 140. Under control of the control signal, the switching device 140 changes the position of the switches 141-144 to bring the electric power supply system 100 in the first operation mode or in the second operation mode. The control system 160 is adapted to control the first converter 121 and the second converter 122 to control the direction of the electric current through respectively the first converter 121 and the second converter 122. For example, the control system 160 is adapted to control the direction of the electric current by means of load-source inversion or by reversing the phase shift. The control system 160 is adapted to receive an information signal from the electric power supply system 100 about a status of the electric power supply system 100. The information signal comprises, for example, information about the electric power provided by the solar panel 110, the temperature of the first battery 111 and/or the second battery 112, a state-of-charge of the first battery 111 and/or the second battery 112, the current value of the second voltage V2 and/or the current value of the third voltage V3.

Figure 3:
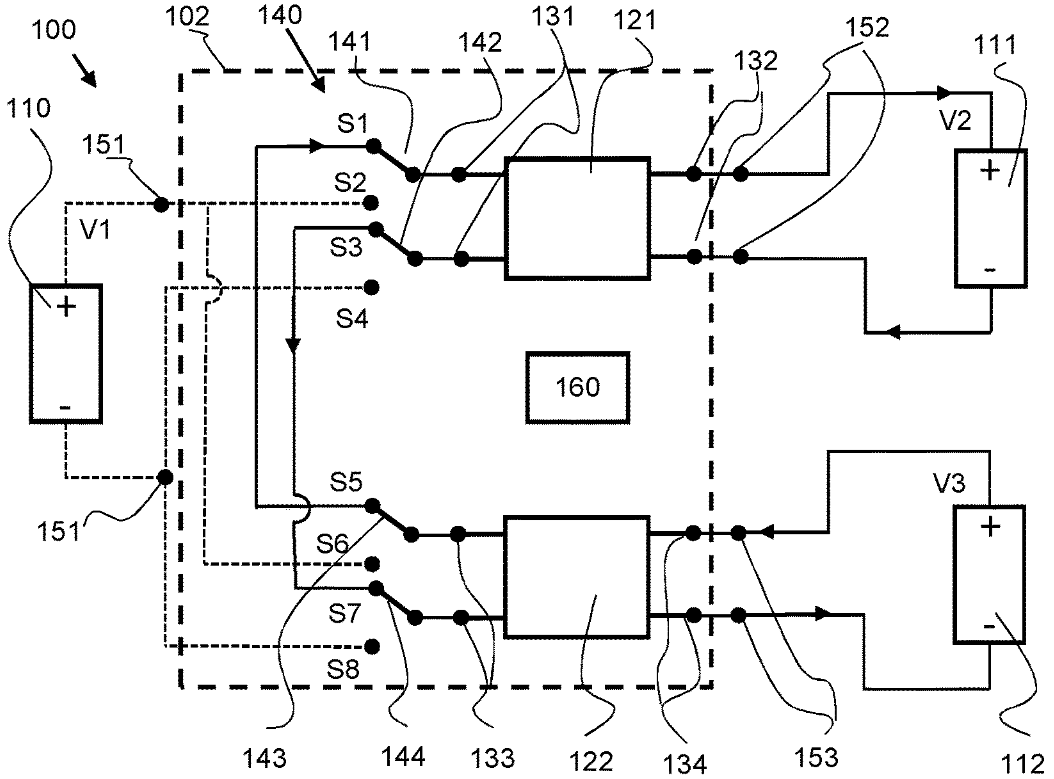
FIG. 3: the embodiment of the invention in a third operation mode in which the second battery charges the first battery.

FIG. 3 depicts the embodiment of the invention in a third operation mode in which the second battery 112 charges the first battery 111. The switching device 140 is adapted to transfer electric power in the third operation mode from the second battery 112 via the second converter 122 to the first terminal 131 of the first converter 121, and from the second terminal 132 of the first converter 121 to the first battery 111. The second converter 122 is adapted to convert the electric power from the second battery 112 from the third voltage V3 at the fourth terminal 134 to the first voltage V1 at the third terminal 133. The first converter 121 is adapted to convert the electric power from the second battery 112 from the first voltage V1 at the first terminal 131 to the second voltage V2 at the second terminal 132.

In the third operation mode, switch 141 is connected to terminal S1 to connect the positive pole of the first battery 111 to the third terminal 133 of the second converter 122. The switch 142 is connected to terminal S3 to connect the negative pole of the first battery 111 to the third terminal 133 of the second converter 122. The switch 143 is connected to the terminal S5 to connect the positive pole of the first battery 111 to the third terminal 133 of the second converter 122. The switch 144 is connected to terminal S7 to connect the negative pole of the first battery 111 to the third terminal 133 of the second converter 122. By connecting the switches 141 and 143 respectively to terminals S1 and S5, and by connecting the switches 142 and 144 respectively to terminals S3 and S7, an electric current is able to flow between the first battery 111 and the second battery 112. This electric current transfers electric power from the second battery 112 to the first battery 111 to charge the first battery 111.

The control system 160 is adapted to control the switching device 140 to connect the switches 141-144 respectively with terminals S1, S3, S5 and S7. The control system 160 may further be adapted to control the direction of the electric current from the second battery 112 to the first battery 111 to charge the first battery 111 with electric power from the second battery 112.

Figure 4:
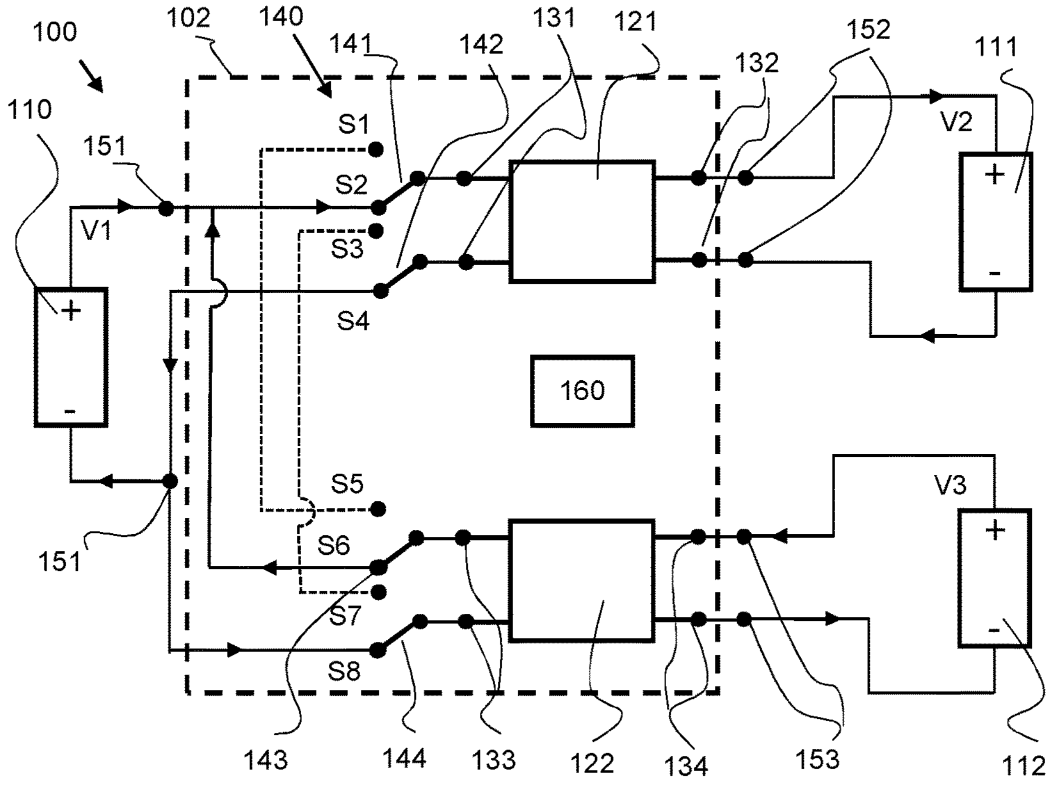
FIG. 4: a second embodiment of the invention in the third operation mode in which the second battery charges the first battery.

FIG. 4 depicts a second the embodiment of the invention. The second embodiment is the same as the embodiment as depicted in FIGS. 1-3, except for the following. The second embodiment of FIG. 4 is in the third operation mode. In the third operation mode, the switching device 140 is adapted to transfer electric power from both the second converter 122 and the solar panel 110 to the first terminal 131 of the first converter 121.

In the third operation mode, switch 141 is connected to terminal S2 to connect the positive pole of the solar panel 110 to the first terminal 131 of the first converter 121. The switch 142 is connected to terminal S4 to connect the negative pole of the solar panel 110 to the first terminal 131 of the first converter 121. The switch 143 is connected to the terminal S6 to connect the positive pole of the second battery 112 to the first terminal 131 of the first converter 121. The switch 144 is connected to terminal S8 to connect the negative pole of the second battery 112 to the first terminal 131 of the first converter 121. By connecting the switches 141 and 143 respectively to terminals S2 and S6, and by connecting the switches 142 and 144 respectively to terminals S4 and S8, two electric currents are able to flow. One electric current flows between the solar panel 110 and the first battery 111. The other electric current flows between the second battery 112 and the first battery 111. As a result, the electric currents transfer electric power from both the solar panel 110 and the second battery 112 to the first battery 111 to charge the first battery 111.

The control system 160 is adapted to control the switching device 140 to connect the switches 141-144 respectively with terminals S2, S4, S6 and S8. The control system 160 may further be adapted to control the direction of the electric current from the second battery 112 to the first battery 111 to charge the first battery 111 with electric power from the second battery 112.

Figure 5:
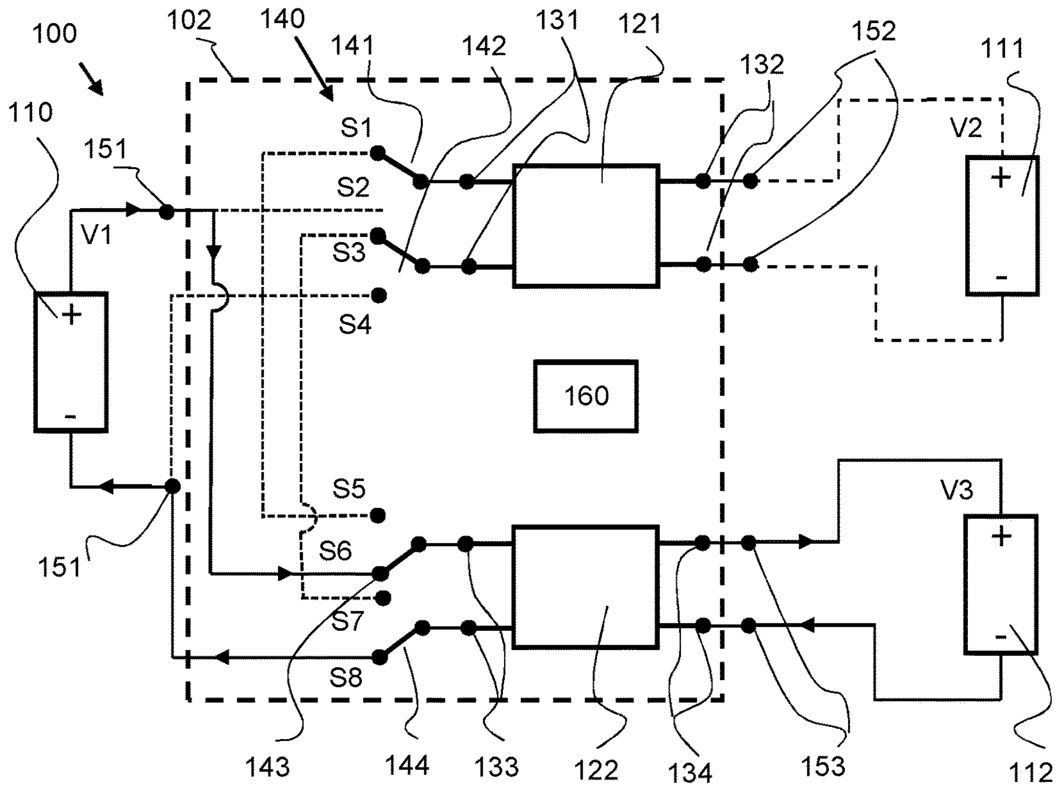
FIG. 5: a third embodiment of the invention in a fourth operation mode in which the solar panel charges the second battery.

FIG. 5 depicts a third embodiment of the invention in a fourth operation mode in which the solar panel 110 charges the second battery 112. The third embodiment is the same as the first embodiment or as the second embodiment as described above, except for the following.

In the fourth operation mode, the switching device 140 is adapted to transfer electric power from the solar panel 110 to the second battery 112. No electric power is transferred from the solar panel 110 to the first battery 111 in the fourth operation mode.

In the fourth operation mode, switch 141 is connected to terminal S1 to disconnect the first converter 121 from the solar panel 110. The switch 142 is connected to terminal S3 to disconnect the first converter 121 from the solar panel 110. The switch 143 is connected to the terminal S6 to connect the positive pole of the solar panel 110 to the third terminal 133 of the second converter 122. The switch 144 is connected to terminal S8 to connect the negative pole of the solar panel 110 to the third terminal 133 of the second converter 122. By connecting the switches 141 and 142 respectively to terminals S1 and S3, and by connecting the switches 143 and 144 respectively to terminals S6 and S8, an electric current is able to flow between the solar panel 110 and the second battery 112, but no electric current is able to flow between the solar panel 110 and the first battery 111. As a result, the electric current transfers electric power the solar panel 110 to the second battery 112 to charge the second battery 112. No electric power is transferred to the first battery 111.

The control system 160 is adapted to control the switching device 140 to connect the switches 141-144 respectively with terminals S1, S3, S6 and S8.

Figure 6:
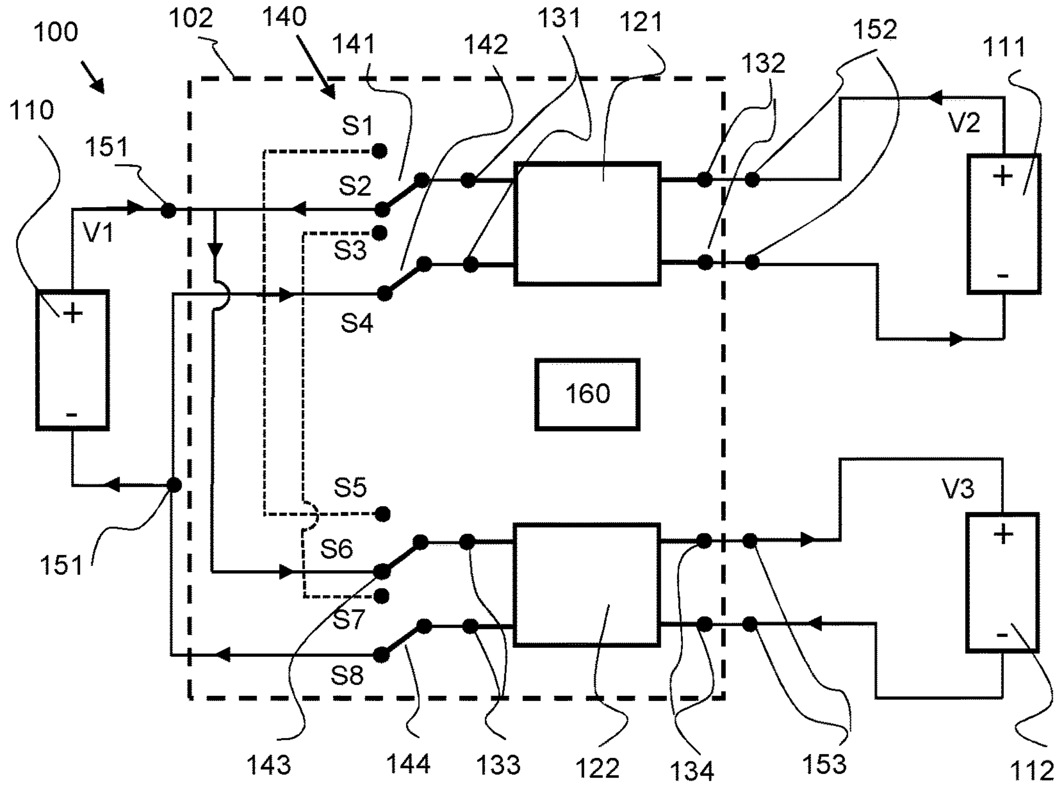
FIG. 6: a fourth the embodiment of the invention in the fourth operation mode in which the solar panel and the first battery charge the second battery.

FIG. 6 depicts a fourth embodiment of the invention in the fourth operation mode in which the solar panel 110 and the first battery 111 charge the second battery 112. The fourth embodiment is the same as the third embodiment as depicted in FIG. 5, except for the following. The fourth embodiment of FIG. 6 is in the fourth operation mode. In the fourth operation mode, the switching device 140 is adapted to transfer electric power from the solar panel 110 and the first battery 111 to the second battery 112.

In the fourth operation mode, switch 141 is connected to terminal S2 to connect the positive pole of the first battery 111 to the third terminal 133 of the second converter 122. The switch 142 is connected to terminal S4 to connect the negative pole of the first battery 111 to the third terminal 133 of the second converter 122. As already shown in FIG. 5, the switch 143 is connected to the terminal S6 to connect the positive pole of the solar panel 110 to the third terminal 133 of the second converter 122. The switch 144 is connected to terminal S8 to connect the negative pole of the solar panel 110 to the third terminal 133 of the second converter 122. By connecting the switches 141 and 143 respectively to terminals S2 and S6, and by connecting the switches 142 and 144 respectively to terminals S4 and S8, two electric currents are able to flow. One electric current flows between the solar panel 110 and the second battery 112. The other electric current flows between the first battery 111 and the second battery 112. As a result, the electric currents transfer electric power from both the solar panel 110 and the first battery 111 to the second battery 112 to charge the second battery 112.

The control system 160 is adapted to control the switching device 140 to connect the switches 141-144 respectively with terminals S2, S4, S6 and S8. The control system 160 may further be adapted to control the direction of the electric current from the first battery 111 to the second battery 112 to charge the second battery 112 with electric power from the first battery 111.

In an embodiment of the invention, the electric power supply system 100 has a switching device 140 that is adapted to connect the solar panel 110, the first battery 111 and the second battery 112 according to first operation mode, the second operation mode, the third operation mode and the fourth operation mode as mentioned above.

As required, this document describes detailed embodiments of the present invention. However it must be understood that the disclosed embodiments serve exclusively as examples, and that the invention may also be implemented in other forms. Therefore specific constructional aspects which are disclosed herein should not be regarded as restrictive for the invention, but merely as a basis for the claims and as a basis for rendering the invention implementable by the average skilled person.

Furthermore, the various terms used in the description should not be interpreted as restrictive but rather as a comprehensive explanation of the invention.

The word “a” used herein means one or more than one, unless specified otherwise. The phrase “a plurality of” means two or more than two. The words “comprising” and “having” do not exclude the presence of more elements.

Reference figures in the claims should not be interpreted as restrictive of the invention. Particular embodiments need not achieve all objects described.

The mere fact that certain technical measures are specified in different dependent claims still allows the possibility that a combination of these technical measures may advantageously be applied.

The invention claimed is:

1. An electric power supply system , comprising:
a solar panel for generating electric power at a first voltage;
a first battery for storing electric power at a second voltage;
a second battery for storing electric power at a third voltage;
a first converter having a first terminal and a second terminal;
a second converter;
a switching device,
wherein the switching device is adapted to transfer electric power in a first operation mode and in a second operation mode,
wherein, in the first operation mode,
the switching device is adapted to transfer electric power from the solar panel to the first terminal of the first converter, and from the second terminal of the first converter to the first battery,
wherein the first converter is adapted to convert the electric power from the solar panel from the first voltage at the first terminal to the second voltage at the second terminal,
wherein, in the second operation mode,
the switching device is adapted to transfer electric power from the first battery to the second terminal of the first converter, and from the first terminal of the first converter to the second converter, and from the second converter to the second battery,
wherein the first converter is adapted to convert the electric power from the first battery from the second voltage at the second terminal to the first voltage at the first terminal, and
wherein the second converter is adapted to convert the electric power from the first battery from the first voltage to the third voltage.

2. The electric power supply system according to claim 1, wherein the first converter is adapted to buck the first voltage at the first terminal to the second voltage at the second terminal in the first operation mode, and to boost the second voltage at the second terminal to the first voltage at the first terminal in the second operation mode.

3. The electric power supply system according to claim 1, wherein the switching device is adapted to transfer electric power in a third operation mode from the second battery via the second converter to the first terminal of the first converter, and from the second terminal of the first converter to the first battery, wherein the second converter is adapted to convert the electric power from the second battery from the third voltage to the first voltage, and wherein the first converter is adapted to convert the electric power from the second battery from the first voltage at the first terminal to the second voltage at the second terminal.

4. The electric power supply system according to claim 3, wherein in the third operation mode, the switching device is adapted to transfer electric power from both the second converter and the solar panel.

5. The electric power supply system according to claim 3, wherein the second converter has a third terminal and a fourth terminal, wherein, in the second operation mode, the third terminal is arranged to receive electric power from the first converter, and the fourth terminal is arranged to transfer electric power to the second battery, wherein the second converter is adapted to boost the first voltage at the third terminal to the third voltage at the fourth terminal, wherein, in the third operation mode, the fourth terminal is arranged to receive electric power from the second battery, and the third terminal is arranged to transfer the electric power to the first converter, wherein the second converter is adapted to buck the third voltage at the fourth terminal to the first voltage at the third terminal.

6. The electric power supply system according to claim 1, wherein, in the second operation mode, the switching device is adapted to transfer electric power from both the first terminal of the first converter and the solar panel to the second converter.

7. The electric power supply system according to claim 1, wherein the second voltage is a high voltage that is higher than the first voltage, wherein the third voltage is a low voltage that is lower than the first voltage.

8. The electric power supply system according to claim 1, wherein the second voltage is a low voltage that is lower than the first voltage, wherein the third voltage is a high voltage that is higher than the first voltage.

9. The electric power supply system according to claim 7, wherein the first voltage is 4-8 times larger than the low voltage, wherein the high voltage is 4-8 times larger than the first voltage.

10. The electric power supply system according to claim 7, wherein the low voltage is in the range of 11-15 V, for example 12 V, wherein the high voltage is in the range 300-430V, for example 360V, and wherein the first voltage is in the range of 50-60V, for example 55V.

11. The electric power supply system according to claim 1, wherein at least one of the first converter and the second converter is adapted to perform maximum power point tracking (MPPT).

12. The electric power supply system according to claim 1, comprising a control system adapted to control the switching device in the first operation mode and in the second operation mode.

13. A vehicle comprising the electric power supply system according to claim 1, and an electric system adapted to receive electric power from the electric power supply system.

14. The vehicle according to claim 13, comprising a drive system to drive the vehicle, wherein the drive system comprises the electric system.

15. The vehicle according to claim 14, comprising an auxiliary system, wherein one of the first battery and the second battery provides electric power to the auxiliary system, wherein the other of the first battery and the second battery provides electric power to the electric system.

16. An electric power conversion system comprising a first converter, a second converter and a switching device, wherein the first converter has a first terminal and a second terminal, wherein the second converter has a third terminal and a fourth terminal, wherein the switching device has a first switch terminal, a second switch terminal, and a third switch terminal, wherein the switching device is adapted to transfer electric power in a first operation mode and in a second operation mode, wherein, in the first operation mode, the switching device is adapted to transfer electric power from the first switch terminal to the first terminal of the first converter, and from the second terminal of the first converter to the second switch terminal, wherein the first converter is adapted to convert the electric power from a first voltage at the first terminal to a second voltage at the second terminal, wherein, in the second operation mode, the switching device is adapted to transfer electric power from the second switch terminal to the second terminal of the first converter, and from the first terminal of the first converter to the third terminal of the second converter, and from the fourth terminal of the second converter to the third switch terminal, wherein the first converter is adapted to convert the electric power from the second switch terminal from the second voltage at the second terminal to the first voltage at the first terminal, and wherein the second converter is adapted to convert the electric power from the first terminal from the first voltage at the third terminal to a third voltage at the fourth terminal.

17. The electric power conversion system according to claim 16, wherein the first converter is adapted to buck the first voltage at the first terminal to the second voltage at the second terminal in the first operation mode, and to boost the second voltage at the second terminal to the first voltage at the first terminal in the second operation mode.

18. The electric power conversion system according to claim 16, wherein the first switch terminal is adapted to be connected to a solar panel, wherein the second switch terminal is adapted to be connected to a first battery, and wherein the third switch terminal is adapted to be connected to a second battery.

19. A method for providing electric power, the method comprising:

step 1: providing electric power at a first voltage with a solar panel to a first battery while converting the electric power from the solar panel from the first voltage to a second voltage, step 2: providing electric power from the first battery to a second battery while converting the electric power from the first battery from the second voltage to the first voltage, and while further converting the electric power from the first battery from the first voltage to the third voltage, step 3: providing electric power from the second battery to the first battery while converting the electric power from the second battery from the third voltage to the first voltage, and while further converting the electric power from the second battery from the first voltage to the second voltage.

20. The method according to claim 19, comprising step 4: providing, while performing step 3, electric power from the solar panel to the first battery while converting the electric power from the solar panel from the first voltage to the second voltage.

* * * * *